Feb. 27, 1951
C. E. FLINCHBAUGH
2,543,452
DRY CEREAL SERVER
Filed Sept. 10, 1946
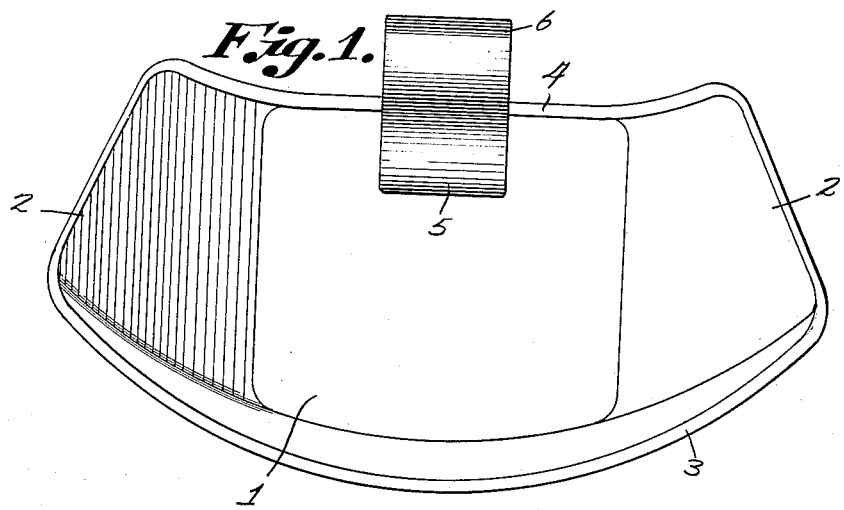
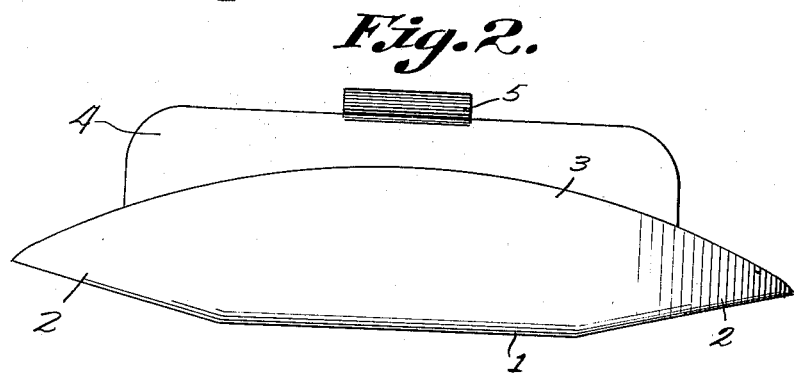
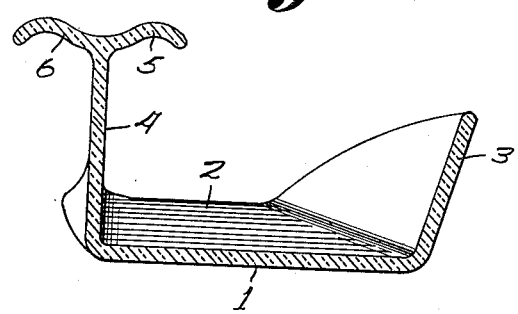
INVENTOR.
Clarence E. Flinchbaugh,
BY Victor J. Evans & Co.
ATTORNEYS Patented Feb. 27, 1951

2,543,452

UNITED STATES PATENT OFFICE 2,543,452

DRY CEREAL SERVER

Clarence E. Flinchbaugh, Richmond, Ind.

Application September 10, 1946, Serial No. 695,871

1 Claim. (Cl. 65—36)

This invention relates to improvements in table utensils, and more particularly to the provision of a device for serving dry cereals.

In the general serving of dry cereals, the cereal is placed in a bowl and the milk or cream is poured over the dry cereals. This makes the cereal soggy and not as tasty as when the cereal remains dry and crisp.

It is, therefore, an object of this invention to provide a device by means of which dry cereals can be served over milk or cream in a bowl, in a manner to maintain the cereal crisp.

A further object is the provision of a device for serving dry cereals over milk or cream, which device can be effectively used with either the right hand or the left hand.

These and other objects are attained by the novel construction and arrangement of parts hereinafter described and illustrated by the accompanying drawings, forming a part hereof, and in which:

Fig. 1 is a plan view of the device for serving dry cereal.

Fig. 2 is a front view of the device.

Fig. 3 is a sectional view of the device.

Referring to the drawings, the dry cereal serving device is shown to comprise a central base 1 having upwardly inclined ends 2. Projecting upwardly from the front of base 1 and inclined outwardly is a lip 3.

A rear wall 4 extends upwardly from the base 1, and has extending at substantially right angles thereto finger pieces 5 and 6.

The general shape of the lip 3 and wall 4 together with base 1 is arcuate so that the device can be used with a swinging movement to spread the cereal evenly over the milk or cream. The exit spouts formed by end portions 2 are at an angle to the operator and enables the cereal to flow from the server with very little twist of the wrist.

The server is symmetrical, and the finger piece is in the center. In operation, the thumb is placed on the top of the finger pieces, and the first finger in finger piece 5, with the second finger in finger piece 6. The arrangement of the finger pieces and the symmetry of the server enables it to be used with ease with either the right hand or the left hand.

It will be seen that there has been provided a simple device for effectively serving dry cereals over milk or cream so that the cereal will remain crisp and not become soggy.

The above description is to be considered as illustrative and not limitative of the invention, of which modifications can be made without departing from the spirit and scope of the appended claim.

The invention having been described, what is claimed is:

In a dry cereal server for dry cereals the improvement comprising a body having a substantially flat base provided with curved longitudinally extending side edge portions and rearwardly inclined end edge portions, upwardly inclined end portions on said base and following the contour of said side and end edge portions, an upstanding rear wall portion perpendicular to the base and extending along the rearward side edge portion, an upwardly extending outwardly inclined front wall portion extending the length of the other side edge portion and following the contour of said side and end edge portion and the upper edge portion of the front wall portion being curved along its entire length, outwardly and upwardly downwardly curved finger pieces centrally of the upper edge of the rear wall portion with the finger portions forming a depression for the thumb centrally of the upper surface thereof and finger impressions on the under surface thereof on opposite sides of the rear wall portion so that said finger pieces may be grasped by the thumb and first two fingers of a hand.

CLARENCE E. FLINCHBAUGH.

REFERENCES CITED

The following references are of record in the file of this patent:

UNITED STATES PATENTS

| Number | Name | Date |
|---|---|---|
| 301,330 | Beck | July 1, 1884 |
| 540,396 | Linen | June 4, 1895 |
| 1,228,373 | Kristofek | May 29, 1917 |
| 1,330,548 | Nowack | Feb. 10, 1920 |
| 1,346,380 | Morris | July 13, 1920 |
| 1,411,336 | Franklin | Apr. 4, 1922 |
| 1,712,451 | Flint | May 7, 1929 |
| 2,110,542 | Allen | Mar. 8, 1938 |

FOREIGN PATENTS

| Number | Country | Date |
|---|---|---|
| 67,079 | Switzerland | Dec. 11, 1913 |